United States Patent
Mogharab-Rahbari et al.

(10) Patent No.: US 9,611,183 B2
(45) Date of Patent: Apr. 4, 2017

(54) PROCESS AND SYSTEM FOR PRODUCING INORGANIC FERTILIZER AND BIOMASS FIBER

(71) Applicant: Cennatek, London (CA)

(72) Inventors: Mohamad Mogharab-Rahbari, London (CA); Nicholas Ivan Ruzich, London (CA)

(73) Assignee: BIOLINE CORPORATION, Alvinston (CA)

(*) Notice: Subject to any disclaimer, the term of this patent is extended or adjusted under 35 U.S.C. 154(b) by 0 days.

(21) Appl. No.: 14/440,970

(22) PCT Filed: Nov. 6, 2013

(86) PCT No.: PCT/CA2013/000931
§ 371 (c)(1),
(2) Date: May 6, 2015

(87) PCT Pub. No.: WO2014/071498
PCT Pub. Date: May 15, 2014

(65) Prior Publication Data
US 2015/0274604 A1    Oct. 1, 2015

Related U.S. Application Data

(60) Provisional application No. 61/723,068, filed on Nov. 6, 2012.

(51) Int. Cl.
*C05B 17/02* (2006.01)
*C05F 11/00* (2006.01)

(52) U.S. Cl.
CPC .............. *C05B 17/02* (2013.01); *C05F 11/00* (2013.01)

(58) Field of Classification Search
CPC ................................ C05B 17/02; C05F 11/00
See application file for complete search history.

(56) References Cited

U.S. PATENT DOCUMENTS 396,274 A    1/1889   Endemann
2,204,621 A   6/1940   Rader
(Continued)

FOREIGN PATENT DOCUMENTS

EP    1110461 A1    6/2001
EP    1464635 A1    10/2004
(Continued)

OTHER PUBLICATIONS

Yohalem et al. "The effect of water extracts of spent mushroom compost on apple scab in the field". Phytopathology. vol. 86, No. 9, 1996 pp. 914-922.*

*Primary Examiner* — Jennifer A Smith
(74) *Attorney, Agent, or Firm* — Miller Thomson LLP; Eduardo Krupnik (57) ABSTRACT

The present invention relates to production of inorganic fertilizers and biomass fiber suitable for thermal conversion processes. A method of producing biomass fiber for thermal conversion processes and inorganic mineral fertilizer from source biomass, includes mixing size reduced source biomass and a fluid under conditions favorable for extracting inorganic nutrients from the size reduced source biomass. A liquid extract phase and a solid phase are separated from the mixture. The liquid extract phase is then concentrated to obtain the inorganic fertilizer. The solid phase is dried to obtain biomass fiber for thermal conversion processes.

19 Claims, 3 Drawing Sheets

(56) References Cited

U.S. PATENT DOCUMENTS

| | | | |
|---|---|---|---|
| 2010/0196981 A1 | 8/2010 | Aharon et al. | |
| 2011/0111456 A1* | 5/2011 | Medoff | B01J 19/085 |
| | | | 435/68.1 |
| 2014/0034253 A1* | 2/2014 | Ferrero | B01D 61/022 |
| | | | 162/29 |

FOREIGN PATENT DOCUMENTS

| | | |
|---|---|---|
| FR | 2890654 A1 | 3/2007 |
| GB | 761356 A | 11/1956 |
| WO | 2008060137 A1 | 5/2008 |
| WO | 2013009153 A1 | 7/2013 |
| WO | 2013133703 A1 | 9/2013 |

\* cited by examiner

PROCESS AND SYSTEM FOR PRODUCING INORGANIC FERTILIZER AND BIOMASS FIBER

CROSS REFERENCE TO RELATED APPLICATIONS

This application is a national stage application under 35 U.S.C. 371 of international Application No. PCT/CA2013/000931, filed Nov. 6, 2013, which in turn claims the benefit under 35 U.S.C. 119(e) of U.S. Provisional Application Ser. No. 61/723,068, filed Nov. 6, 2012, the contents of each of which are hereby incorporated by reference into the present disclosure.

FIELD OF THE INVENTION

The present invention relates to methods and systems for the extraction of inorganic minerals from various forms and sources of biomass and for the refinement of the extract to produce inorganic fertilizers. More particularly, the present invention relates to methods and systems for processing agricultural based residues, marginal and native grasses and energy crops into inorganic fertilizers and the co-production of high quality biomass fiber for the production of various forms of energy, chemicals, fuels, and additives.

BACKGROUND OF THE INVENTION

Biomass has been identified as a renewable energy source that can substitute some of the world's energy demands currently supplied by fossil fuels. Biomass is a particularly attractive alternative to coal and oil for heat and electricity generation and as a source of raw material for the production of fiber based products, conversion to liquid fuels, and as feedstock to gasification and pyrolysis processes.

Low quality has been the most significant technical challenge for the use of agricultural sourced biomass for these applications. High concentrations of inorganic minerals, also referred to as nutrients present in the biomass, including: nitrogen, phosphorous, potassium, chlorine, sodium, magnesium, calcium, silica and other inorganics, have significant negative impact on the quality of the biomass, especially if thermal conversion processes such as: combustion, gasification, and pyrolysis are used. These negative impacts include: (1) the formation of eutectic mixtures of silicates that significantly reduce the melting temperature of the biomass and resulting ash; (2) the formation of deposits, slags, and fouling in equipment at typical combustion temperatures; (3) corrosion and toxic air pollution; and (4) an overall reduction in thermal conversion efficiency in the power generation facility.

Forestry residues, such as wood chips and saw dust have lower concentrations of these inorganic nutrients, and as a result produce higher quality fiber. Biomass fiber from forestry have been used as feedstock for combustion gasification, pyrolysis, torrefaction and other industrial processes to produce: heat, electricity, ethanol, methanol, iso-butanol and other chemicals, and products such as: pulp, paper, fiberboard and clumping agent for cat litter. There are limits to how much biomass fiber can be sustainably harvested from the World's forests. Other sources of biomass such as crop residues, marginal and native grasses, and energy crops are an alternative source of biomass fiber if some of the quality issues can be addressed. One approach most commonly used to reduce inorganic nutrient content is field leaching. Field leaching refers to the natural leaching of plant material (including inorganic nutrients) left out in the field through a combination of rain, dew, mist and fog. Instead of harvesting the energy-crop or collecting residues at the time of harvest in early fall, the biomass is left in the field over the winter months and collected in early spring the following year. The various forms of precipitation over these months would naturally leach out a portion of the nutrients in the biomass.

While field leaching does remove some of the nutrients from the biomass, there are several disadvantages to the process that make field leaching inadequate for producing a consistent product that meets end-use quality requirements, including: (1) poor control of the process, with high susceptibility to weather variability; (2) contamination of the biomass from the soil; (3) partial reduction in inorganic nutrients resulting in high variability from farm to farm; (4) unpredictable and difficult scheduling of operations for subsequent crops; (5) only a viable option in moderate and colder climates since multiple growing seasons are possible in warmer climates and field leaching would severely interfere with the next crop rotation; (6) yield loss in organic matter of up to 40% in some crops; and (7) often net increase in ash content resulting from the non-leached nutrients predominately consisting of silica representing a higher percentage of the remaining material that has experienced 40% yield loss in organic matter.

An industrial process that could be used to extract inorganic minerals from a variety of biomass sources would be advantageous. It would be further advantageous if the inorganic minerals that are extracted could be refined by the process to produce a high-value co-product such as an inorganic fertilizer.

To date there are no technologies commercially available capable of extracting inorganic nutrients from biomass, and of co-producing a significantly improved biomass fiber and liquid inorganic fertilizer. Research conducted into the development of nutrient extraction processes for biomass has been limited and has failed to render a process that is either scalable for industrial use or economical. The disadvantages of approaches investigated by other researchers include: (1) very long biomass residence times requirements (24 hrs or more) limiting throughput; (2) very large volumes of water required (as high as 150:1 of water to biomass by weight); (3) requirements for bacteria, microbes, and chemicals to enable digestion, hydrolysis or acidification of biomass; (4) mostly batch processes that are difficult to scale-up; (5) very large reactor vessels and foot-print requirements (6) low nutrient extraction efficiency; (7) inadequate refinement of the extract renders the stream as a low-value by-product often needing disposal; and (8) need for fine comminution of the biomass, thus requiring more time and energy.

It would be desirable to develop a process that is capable of extracting substantially all of the inorganic nutrients from various sources of biomass. It would be further desirable if the process was able to remove: about 95% of the chlorine (Cl) in the biomass or more; about 90% of the potassium (K) in the biomass or more; about 80% of the phosphorous (P) in the biomass or more; about 70% of the magnesium (Mg) and sodium (Na) in the biomass or more; and at least about 40% of the nitrogen (N) in the biomass.

It would be further desirable if the process could achieve this in a continuous and compact reactor that requires less than 40 minutes biomass residence time in the reactor. A process that can achieve high extraction efficiency using only water as the extraction solvent at room-temperature reducing energy demands for the process, and at ratios as low as about 10:1 (water-to-biomass by weight). It would be further desirable if the process could allow for more than about 80% of the water used in the extraction process to be recycled within the process, thus reducing the demand for make-up water to the reactor. It would be further desirable if the about 20% of water exiting the process in the form of an extract could be refined to produce a product such as a liquid inorganic fertilizer.

The present invention presents an inventive process, which may serve to extract undesirable inorganic minerals (also referred to as inorganic nutrients) from various sources of plant-based biomass to produce inorganic fertilizer and/or co-produce a higher quality biomass fiber.

Further and other objects of the invention will be realized from the following Summary of the Invention, the Discussion of the Invention and the embodiments and Examples thereof.

SUMMARY OF THE INVENTION

In one embodiment, the present invention provides for a method of co-producing biomass fiber for downstream processing and conversion and inorganic mineral fertilizer from source biomass. In one embodiment, the method includes: (a) size reducing the source biomass to reduce the average particle size of the source biomass; (b) mixing the size reduced source biomass and a fluid under conditions favourable for extracting inorganic mineral nutrients from the size reduced source biomass to form a mixture; (c) separating solid biomass fiber from the mixture thereby producing a liquid extract phase and a solid phase comprising the biomass fiber; (d) drying the solid phase, thereby obtaining biomass fiber for thermal conversion processes; and (e) concentrating the liquid extract phase of step (c) thereby co-obtaining the inorganic mineral fertilizer.

In another embodiment of the co-production method of the present invention, the method further includes the step of formulating the inorganic mineral fertilizer to desired stoichiometric levels of minerals for specific fertilizer applications.

In another embodiment of the co-production method of the present invention, the biomass of step (a) is provided as a bale of source biomass and the method further includes breaking the bale apart and removing non-plant materials from the source biomass.

In another embodiment of the co-production method of the present invention, step (b) comprises size reduction of the source biomass so as to obtain biomass particles of about 4 mm to about 60 mm in size.

In another embodiment of the co-production method of the present invention, step (c) comprises using a screener with aperture size of about 125 to 500 microns to separate the solid biomass fiber from the mixture.

In another embodiment of the co-production method of the present invention, the solid phase of step (c) comprises a moisture content of about 80%.

In another embodiment of the co-production method of the present invention, step (c) comprises using a screener with aperture size of about 125 to 500 microns to separate the solid biomass fiber from the mixture thereby producing a first liquid extract phase and a first solid phase comprising the biomass fiber; and step (d) comprises mechanically dewatering the first solid phase thereby obtaining a second solid biomass fiber and a second liquid extract, the second liquid extract being used as the liquid extract of step (e).

In another embodiment of the co-production method of the present invention, a first portion of the second liquid extract is used as part of the fluid of step (b), and a second portion of the second liquid extract is used as the liquid extract to prepare the inorganic fertilizer.

In another embodiment of the co-production method of the present invention, the first portion of the liquid extract comprises from about 50% to about 90% of the fluid of step (b).

In another embodiment of the co-production method of the present invention, the method further comprises reducing a total suspended solids (TTS) of the second portion of the liquid extract to less than about 300 ppm.

In another embodiment of the co-production method of the present invention, the method further comprises filtering the second portion of the liquid extract having TTS of less than about 300 ppm using reverse osmosis membranes. In one aspect of this embodiment, a combination of reverse osmosis membranes and ultra-filtration membranes are used.

In another embodiment of the co-production method of the present invention, the inorganic nutrients in the filtrated second portion of the liquid extract is concentrated using evaporation.

In another embodiment of the co-production method of the present invention, the method further comprises filtrating the liquid extract phase using reverse osmosis membranes prior to the concentrating. In one aspect of this embodiment, a combination of reverse osmosis membranes and ultra-filtration membranes are used and ultra-filtration membranes.

In another embodiment of the co-production method of the present invention, step (d) comprises mechanically dewatering the biomass fiber to obtain a substantially dewatered biomass, and heat drying the substantially dewatered biomass.

In one embodiment, the present invention relates to a method of producing inorganic mineral fertilizer from source biomass. In one embodiment, the method of producing inorganic fertilizer from source biomass includes: (a) size reducing the source biomass to reduce the average particle size of the source biomass; (b) mixing the size reduced source biomass and a fluid under conditions favourable for extracting inorganic minerals from the size reduced source biomass to form a mixture; (c) separating solid biomass fiber from the mixture thereby producing a liquid extract phase and a solid phase comprising biomass fiber; and (d) concentrating the liquid extract phase of step (c) thereby producing the inorganic mineral fertilizer.

In another embodiment, the method of producing inorganic fertilizer from source biomass further includes the step formulating the liquid inorganic mineral fertilizer to desired stoichiometric levels of minerals for specific liquid fertilizer applications.

In another embodiment of the method of producing inorganic fertilizer from source biomass, the biomass of step (a) is provided as a bale of source biomass and the method further includes breaking the bale apart and removing non-plant materials from the source biomass.

In another embodiment of the method of producing inorganic fertilizer from source biomass, step (b) comprises size reducing the source biomass so as to obtain biomass particles of about 4 mm to 60 mm in size.

In another embodiment of the method of producing inorganic fertilizer from source biomass, step (c) comprises using a screener with aperture size of about 125 to 500 microns to separate the solid biomass fiber form the mixture.

In another embodiment of the method of producing inorganic fertilizer from source biomass, step (c) comprises using a screener with aperture size of about 125 to 500 microns to separate the solid biomass fiber from the mixture thereby producing a first liquid extract phase and a first solid phase comprising the biomass fiber; and step (d) comprises mechanically dewatering the first solid phase thereby obtaining a second solid biomass fiber and a second liquid extract, the second liquid extract being used as the liquid extract of step (e).

In another embodiment of the method of producing inorganic fertilizer from source biomass, a first portion of the second liquid extract is used as part of the fluid of step (b), and a second portion of the liquid extract is used as the liquid extract to prepare the inorganic fertilizer.

In another embodiment of the method of producing inorganic fertilizer from source biomass, the first portion of the liquid extract comprises from about 50% to about 90% of the fluid of step (b).

In another embodiment of the method of producing inorganic fertilizer from source biomass, the method further comprises reducing total suspended solids (TTS) of the second portion of the liquid extract to less than about 300 ppm.

In another embodiment of the method of producing inorganic fertilizer from source biomass, the method further comprises filtrating the second portion of the liquid extract having TTS of less than about 300 ppm using reverse osmosis membranes. In one aspect of this embodiment, a combination of reverse osmosis membranes and ultra-filtration membranes are used.

In another embodiment of the method of producing inorganic fertilizer from source biomass, the method further comprises filtrating the liquid extract phase using reverse osmosis prior to the concentrating. In one aspect of this embodiment, a combination of reverse osmosis membranes and ultra-filtration membranes are used.

In one embodiment, the present invention provides for a method of producing biomass fiber for downstream processing and conversion, the method, in one embodiment includes: (a) reducing the size the source biomass to reduce the average particle size of the source biomass; (b) mixing the size reduced source biomass and a fluid under conditions favourable for extracting inorganic mineral nutrients from the size reduced source biomass to form a mixture; (c) separating solid biomass fiber from the mixture thereby producing a liquid extract phase and a solid phase comprising the biomass fiber; and (d) drying the solid phase, thereby obtaining biomass fiber for downstream processing and conversion.

In another embodiment of the method of producing biomass fiber for downstream processing and conversion from source biomass, the biomass of step (a) is provided as a bale of source biomass and the method further includes breaking the bale apart and removing non-plant materials from the source biomass.

In another embodiment of the method of producing biomass fiber downstream processing and conversion from source biomass, step (b) comprises size reducing the source biomass so as to obtain biomass particles of about 4 mm to 60 mm in size.

In another embodiment of the method of producing biomass fiber for downstream processing and conversion from source biomass, step (c) comprises using a screener with aperture size of about 125 to 500 microns to separate the solid biomass fiber from the mixture.

In another embodiment of the method of producing biomass fiber for downstream processing and conversion from source biomass, step (c) comprises using a screener with aperture size of about 125 to 500 microns to separate the solid biomass fiber from the mixture thereby producing a first liquid extract phase and a first solid phase comprising the biomass fiber; and step (d) comprises mechanically dewatering the first solid phase.

In yet another embodiment of the methods of the present invention, the fluid is water and the biomass is selected from agricultural residues, marginal grasses and energy crops.

In yet another embodiment of the methods of the present invention, the methods further include the step of removing contaminants from the source biomass.

BRIEF DESCRIPTION OF THE DRAWINGS

The following figures illustrate various aspects and preferred and alternative embodiments of the invention.

DESCRIPTION OF THE INVENTION

Definitions

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise. In order to aid in the understanding and preparation of the within invention, the following illustrative, non-limiting, examples are provided.

Examples of agricultural residues may include: corn-stover, wheat-straw, hay, hemp, rice hulls, oat hulls, fruit and vegetable vines, spent mushroom substrate, other plant-based waste organic matter, and other un-harvested agricultural wastes. Marginal grasses include: all native grasses, reed canary grass, perennial vegetation, cattails, phragmite, and other vegetation native to any region. Energy crops include: various tropical grasses, miscanthus, king grass, elephant grass, switchgrass and other vegetation purposely grown for energy production and/or other industrial uses. In this document the term "biomass" refers to agricultural residues, marginal grasses and energy crops. The term "fluid" refers to liquids such as water or any other suitable liquid.

Overview

The present invention relates to methods and means of extracting inorganic minerals, also referred to as undesirable nutrients or inorganic nutrients, from biomass. The extracted undesirable nutrients may be used to produce inorganic fertilizers or liquid inorganic fertilizers. The extraction of the inorganic nutrients may also result in substantially improving the quality of the biomass fiber.

Source of Biomass Feedstock

The applicants have developed a novel method to produce inorganic fertilizer and co-produce high quality biomass fiber from low quality sources of biomass. The sources of biomass may include agricultural residues, marginal grasses and energy crops. In most circumstances, and for most sources of biomass, the biomass may be harvested and stored, for example in bale format, at moisture contents ranging between about 15% and 65%. For long-term storage (more than several weeks) of some sources of biomass it may be preferred if the biomass were baled at moisture contents ranging between about 15-30% and stored in a way to limit exposure to moisture prior to processing by the methods of the present invention.

Decontamination

The invention will be described in more detail using FIG. 1, which is a diagram illustrating the processes and systems of the invention.

Figure 1:
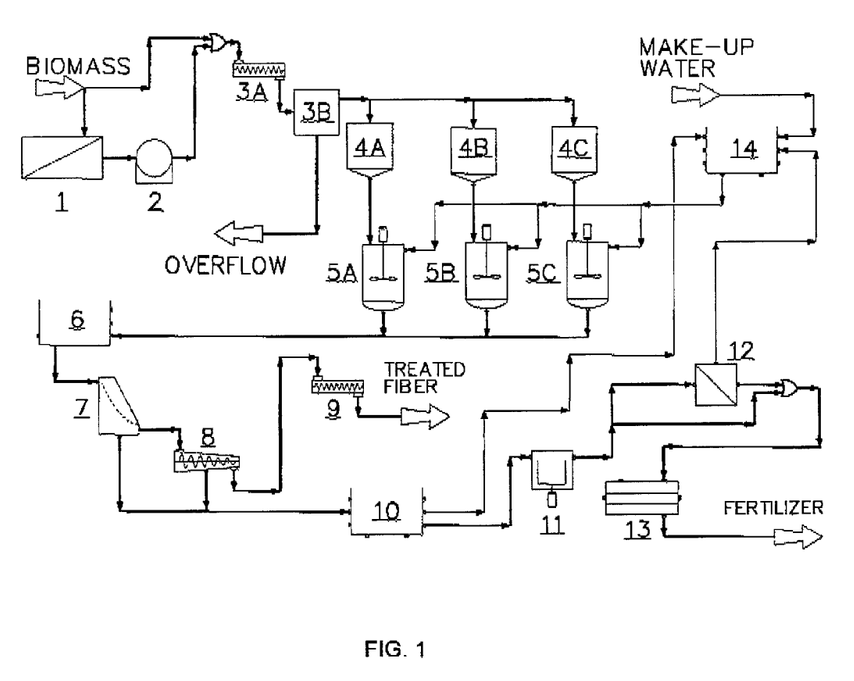
FIG. 1. Diagram illustrating the methods and systems of the present invention.

FIG. 1 shows biomass, which may be loose biomass, being conveyed into a screener (1). In many cases the biomass may be received and stored in bale format, and an additional step may be required to break the bales open. The screener may be equipped with screens that have an aperture of less than about 20 mm. Preferably the screener would be divided in two segments with the initial entrance segment being equipped with 20 mm screens and the final exit segment 10 mm screens. Any stones, dirt, broken glass and other fine foreign objects smaller than the screen aperture will be shaken loose from the biomass and fall through the screen apertures. One non-limiting example of such screening system is a trommel screener which consists of a rotating screened cylinder that is angled to allow the material to tumble forward from the entrance end of the screened cylinder to the exit end of screened cylinder. The screener may discharge the material to conveyors equipped with an over-head magnetic conveyor and/or magnetic head rollers and/or rare earth magnetic head rollers. The magnetic devices would remove any metal contaminants from the biomass. The decontaminated biomass is conveyed from the screener into size reduction apparatus (2).

Size Reduction of the Biomass

The biomass may be size reduced by any known method in the art to obtain particle size of about 4 to 60 mm. It is preferable to reduce the particle size of the biomass to about 8-20 mm. One non-limiting example of such size reduction systems are tub grinders (Haybusters), commonly used in the agricultural industry to produce forage. After particle size reduction (2) the particles of biomass may be fed to a nutrient extraction reactor, such as the nutrient extraction reactor of the present invention, using an auger. For some sources of biomass the decontamination systems (1) and the size reduction systems (2) may not be required and the biomass may be directly fed to the nutrient extraction reactors as shown in FIG. 1.

Nutrient Extraction

The biomass may be mixed with a fluid, such as water, under conditions favourable for the extraction of inorganic nutrients from the biomass. In most cases may consist of water at room temperature. Adjustment of pH may be required to between 4-9 for some forms of biomass. In this example an inventive multi-vessel reactor is used. However, it should be understood that the methods of the present application may be practiced using other vessels and or extractors, and or reactors. In this example the nutrient extraction reactor consist of a feed auger (3A) with a variable-frequency drive that is used to meter the biomass through a diversion system (3B) to fill two or more feed hoppers (4A, 4B, and 4C). The feed hoppers are equipped with weight measurement devices to control the amount of biomass that is fed to each hopper. Weight measurements on the hopper will be used as sensory inputs to a controller that will control the throughput from the auger and the positioning of material through the diversion system. The diversion system will divert material into feed hoppers 4A or 4B or 4C, and in cases where all three hoppers have the desired weight of material in them to an overflow discharge. This system of an auger with a variable-frequency drive (3A) and a diverter system (3B) and two or more feed hoppers (4A, 4B, and 4C) allows for continuous operation of a multi-vessel nutrient extraction reactor, where each vessel is extracting nutrients from a batch of biomass. Referring to FIG. 1, the nutrient extraction reactor vessels (5A, 5B and 5C) consist of two or more continuous stirred-tank reactors (CSTR). Each CSTR vessel may include a shell and baffles, centrally disposed drive shaft extending axially downwardly into the tank and driven by a motor and associated gearbox disposed at one end of the shaft. An agitator is connected to the end of drive shaft opposite to the motor. The agitators may include agitation blades extending radially outwardly from diametrically opposite sides of the shaft. The agitation system may be driven by an electric motor to run at around 500 to 1000 rpm. The agitation system comprised of combination of blades and/or impellers used to achieve high shear dispersion, and pumping action inside the vessel.

Both the hoppers and the vessels may be designed in such a way as to minimize the drain and fill time of the vessels and in turn maximize the amount of biomass that can be processed over time by the vessels. The feed hoppers (4A, 4B, 4C) may be placed directly above each of the vessels (5A, 5B, 5C) and may be filled while the vessels are operating. This may allow the feed hoppers to be full and ready to empty into the vessels once they have been drained of the previous batch. The gates beneath the feed hoppers may then open and release the biomass.

The vessels (5A, 5B, 5C), likewise, may be raised off of the ground above the drain tanks (6) with large drain openings to allow for the fastest drain time. The vessels may be filled with a suitable fluid, such as water, from a raised fluid tank (14) by a pump that may be sized to fill a vessel in about one to two minutes. The fluid tank (14) may be raised above the vessels to minimize the size of the pump required. Two level switches may be used to signify when the vessels are full and empty. All of the feed hoppers (4A, 4B, 4C), the fluid tank (14), and the feed pump as well, as the agitation system, may be placed on a structure around the nutrient extraction vessels (5A, 5B, 5C).

The biomass will be agitated with the fluid inside each CSTR vessel for around 10 to 40 minutes at which point the agitator may be stopped and the slurry may be discharged from the vessel into a drain tank (6).

Primary Liquid-Solid Separation Screener

The liquid/solid mixture or biomass slurry discharged to the drain tank (6) in the previous step may be pumped into any known method in the art of separating solids from liquids (7). The separation method could be a screener with apertures of about 125-500 microns. It is preferred that the screener have an aperture of less than about 250 microns. It is also preferred that the screener be able to process the material in a continuous operation, be equipped with self-cleaning mechanisms capable of substantially reducing and/or eliminating any potential blinding of screens.

Secondary Liquid-Solid Separation Using Mechanical Dewatering

The biomass fiber separated from the previous step, leaving the primary liquid-solid separator (7) may be mechanically conveyed using augers into any known mechanical dewatering method (8) in the art of squeezing water from highly adsorbent material. It is preferable that the mechanical dewatering methods be capable of processing the material continuously and reduce the moisture content of the biomass fiber to about 35%-55%. It is further preferable to achieve less than about 45% moisture using this method. One non-limiting example of such mechanical dewatering device is a dewatering screw press. The liquid extract leaving this system (8) may be combined with the liquid extract leaving the primary liquid solid separator (7) in a surge tank (10). A portion of the mass flow rate of this liquid extract may be pumped into the fluid tank (14) and recycled back to the nutrient extraction reactor. In the fluid tank (14) make-up fluid may also be added continuously. The liquid extract being recycled back from the surge tank (10) may constitute 50% to 95% of the mass flow rate of liquid going from the fluid tank (14) to the nutrient extraction vessel (5A, 5B, 5C). Fluid from membrane filtration (12) and make-up water will comprise the remaining portions of the mass flow. It may be preferable to have the recycle liquid extract constitute at least 90% of the mass flow rate of fluid going to the nutrient extraction vessels.

The treated fiber leaving the dewatering screw press (8) may be fed through an auger (9) for transfer to downstream processing as a high quality fiber co-product of the present invention. At this stage, the treated fiber has substantially lower concentrations of inorganic minerals and is a higher quality fiber for any thermal, chemical or mechanical process.

The portion of the mass flow rate of the liquid extract from the surge tank (10) that is not recycled back to the fluid tank (14) may be pumped to a clarifying centrifuge (11). At this stage in the process we may begin referring to the portion of liquid extract that is pumped to the clarifying centrifuge as the liquid inorganic fertilizer.

Primary Liquid Inorganic Fertilizer Refinement Using a Clarifying Centrifuge

For many liquid inorganic fertilizer applications it is undesirable to have any solids particulates and organic matter in the liquid inorganic fertilizer. For these liquid inorganic fertilizers it may be preferably to substantially reduce any organic matter and/or suspended solids that may have ended up in the liquid extract from previous steps. Any known method in the art of reducing total suspended solids may be used in this step to reduce the total suspended solids (TSS) concentration of the liquid inorganic fertilizer to less than 100 to 300 µm at this stage. One non-limiting example of such a system is a clarifying centrifuge. The liquid inorganic fertilizer leaving the centrifuge (11) is pumped to a membrane-based system for further concentration of the nutrients and/or clarification of the liquid inorganic fertilizer.

Secondary Liquid Inorganic Fertilizer Refinement Using Membrane-Based Filtration The concentration of the inorganic nutrients in the liquid inorganic fertilizer leaving the centrifuge clarifier (11) at this stage in the overall process is still very low. Reverse osmosis (RO) and ultra-filtration are two membrane-based filtration techniques (12) well known in the art, often used to separate dissolved solutes from a solution. Reverse osmosis offers the finest membrane filtration operation rejecting most dissolved solutes, such as ions, as well as all remnants suspended solids. The RO system is used to concentrate the nutrients in the retentate and produce a nutrient free permeate that is pumped back to the fluid tank (14) as part of the make-up fluid supply to the reactor. It is preferable that the RO system is capable of concentrating the nutrients in at least 50% of the volume of the liquid inorganic fertilizer going to the system, thus producing 50% of the feed volume as permeate fluid. The retentate leaving the Reverse Osmosis system (12) is pumped to a thermal refiner (13) where evaporation may be used to further concentrate the inorganic nutrients in the liquid inorganic fertilizer.

Any filtration devices known in the art may be used. Filtration device may include, but is not limited to any of the following devices: particle filters, charcoal filters, reverse osmosis filters and combinations thereof.

Concentration of Liquid Inorganic Fertilizer and Drying of Biomass Fiber Using Thermal Energy Thermal energy is required at this stage of the process to further concentrate the inorganic nutrients in the liquid inorganic fertilizer using evaporation.

The inorganic nutrient content in the liquid inorganic fertilizer after membrane separation is still relatively low compared to concentrations required for commercial use. Thus it is desirable to use evaporation to further concentrate the inorganic nutrients in the liquid inorganic fertilizer stream. The liquid inorganic fertilizer exiting the evaporator (13) may be forwarded to a formulation tank. In the formulation tank a batch of liquid inorganic fertilizer is tested for its mineral content and additional water soluble minerals are added at specific ratios to achieve desired mineral stoichiometry in the final product being produced.

The methods of the present invention may be used for removing some other forms of soluble components from other types of solids, and refining the extract using similar sequence of steps as outlined in this method to recover other product of value from the extract.

Advantages of the Invention Over the Prior Art a) An advantage of the present invention is that it provides for methods and apparatuses to effectively and efficiently extract large percentage of inorganic minerals found in various sources of biomass.

b) Another advantage of the present invention is that it provides for methods and apparatuses to effectively and efficiently refine the resulting extract to produce commercially viable liquid inorganic fertilizers.

c) Yet another advantage of the present invention is that it provides for methods and apparatuses to extract very high percentage of chlorine (about 95% or better), alkali metals (from about 75% to about 95%) and alkaline earth metals (about 65% to about 95%) from agricultural residues, marginal grasses and energy crops. These inorganic minerals are the most problematic minerals in the biomass intended for use in thermal applications such as combustion, gasification, pyrolysis and torrefaction.

d) Yet another advantage of the present invention is that it provides for methods and apparatuses to extract very high percentage of phosphorous (about 70%-about 90%) and potassium (about 75%-about 95%), and a significant portion of nitrogen (about 30%-about 60%) which combine to make the most important inorganic nutrients for plant fertility.

e) Yet another advantage of the present invention is that it provides for methods and apparatuses to extract inorganic minerals from various forms of biomass in a reactor, where the required residence time for the biomass in the reactor may be as little as about 10 minutes and a maximum of about 40 minutes.

f) Yet another advantage of the present invention is that it provides for methods and apparatuses to extract inorganic minerals using only water without requirement of any chemicals, solvents, or microbes to digest or hydrolyze the biomass.

g) Yet another advantage of the present invention is that it provides for methods and apparatuses to extract inorganic minerals from biomass using water at low temperatures without the requirement of heating the water, or the reactor during extraction.

h) Yet another advantage of the present invention is that it provides for methods and apparatuses to extract inorganic minerals from biomass and refine the resultant extract to produce liquid inorganic fertilizers consisting of 100% water soluble primary macro nutrients (NPK), secondary macronutrients and micronutrients with no particulates, solids, or organic matter.

i) Yet another advantage of the present invention is that it provides for methods and apparatuses to extract inorganic minerals from various sources of biomass allowing for a substantially consistent and controllable quality of fiber. The method of the present invention serves as an equalizer that enables a wide range of biomass sources with varying mineral contents and combustion properties to be used to produce a biomass fiber with consistent and controllable properties.

The substantially higher quality coarse biomass fiber obtained according to the embodiments of the present invention, may be used as filler in plastics (light weighting), as feed to pulp production, paper production, and MDF board production. The biomass fiber obtained according to the present invention may also be used to produce various chemicals such as succinic acid, cellulosic ethanol, and a host of other chemicals, and fuels. The biomass fiber of the present invention may be pyrolyzed to produce oils, lubricants, and diesel. It may also be gasified to produce methanol, iso-butanol and a host of other chemicals. It may also be converted to bio-coal through torrefaction or simply thermally converted to produce heat, syngas, steam, electricity and other energy products.

In order to aid in the understanding and preparation of the within invention, the following illustrative, non-limiting, examples are provided.

Example 1

A non-limiting example of the methods and systems of the present invention was constructed and used to extract inorganic minerals from corn stovers, cattails, and miscanthus. Table 1 shows the resulting reduction in the mineral content of each type of biomass after treatment.

Fluid: water at room temperature. Residence time: up to 40 minutes. Biomass/water ratio 1/10 by weight.

TABLE 1

Percent Reduction in Weight Percentage of Key Inorganic Minerals After Treatment

|  | Corn Stover (% reduction) | Cattails (% reduction) | *Miscanthus* (% reduction) |
|---|---|---|---|
| Nitrogen (N) | 66.3% | 9.8% | 21.9% |
| Chlorine (Cl) | 98.7% | 73.9% | No data |
| Potassium (K) | 64.0% | 91.1% | 89.6% |
| Phosphorous (P) | 67.3% | 72.6% | 87.5% |
| Calcium (Ca) | 35.3% | 21.7% | 57.7% |
| Magnesium (Mg) | 43.7% | 66.5% | 76.9% |
| Iron (Fe) | 49.7% | 50.9% | 38.4% |
| Manganese (Mn) | 45.2% | 53.9% | 62.0% |
| Silica (Si) | 42.6% | 59.6% | 24.2% |

Table 2 shows the improvement in ash content, calorific value, and ash fusion temperature of the fiber after treatment.

TABLE 2

Improvement in Key Quality Characteristics of the Fiber After Treatment

|  | Corn Stover | | Cattails | | *Miscanthus* | |
|---|---|---|---|---|---|---|
|  | Before | After | Before | After | Before | After |
| Ash Content (wt %) | 5.12% | 2.05% | 7.01% | 2.73% | 3.31% | 1.67% |
| Calorific Value, HHV (MJ/kg) | 18.9 | 19.2 | 19.6 | 20.8 | 19.3 | 20.0 |
| Initial Deformation Temperature (° F.) | 2513 | >2625 | 2120 | 2257 | 897 | 2542 |

Figure 2:
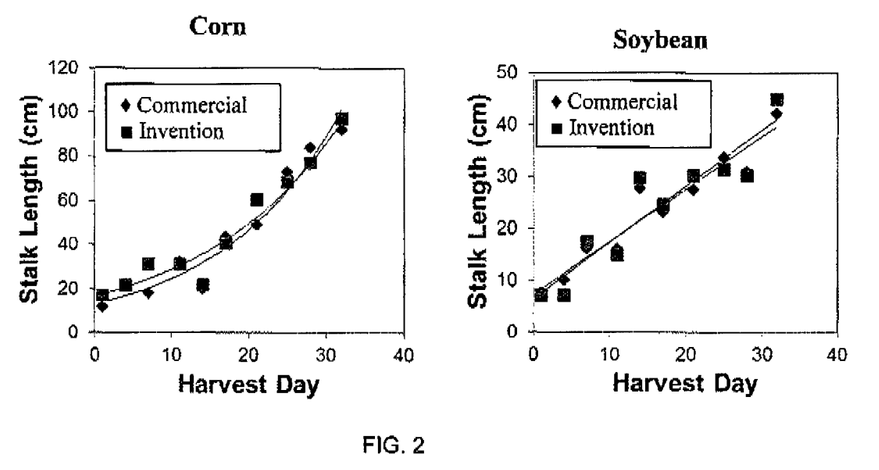
FIG. 2. Graph that illustrates a comparison of the corn and soy stalk length at different harvest times.

The liquid inorganic fertilizer produced from a non-limiting embodiment of this invention was tested for its efficacy against commercial liquid inorganic starters. The trials were conducted on a farm. Field trials were carried out on a small plot with corn and soybean. FIG. 2 depicts a comparison of the corn and soy stalk length at different harvest times. The data points depict lengths measured for the stalks treated with the liquid inorganic fertilizer produced from an embodiment of this invention versus commercially available liquid inorganic starters.

Figure 3:
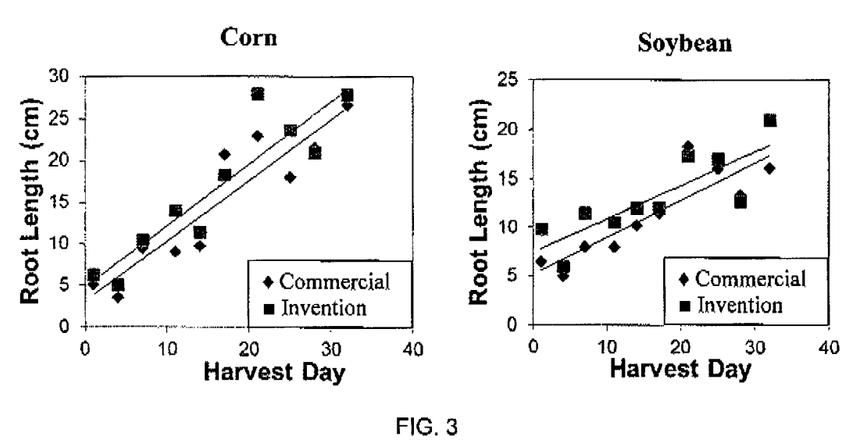
FIG. 3. Graph illustrating a comparison of the corn and soy root lengths at different harvest times.

FIG. 3, depicts a comparison of the corn and soy root lengths at different harvest times.

The above disclosure generally describes the present invention. Changes in form and substitution of equivalents are contemplated as circumstances may suggest or render expedient. Although specific terms have been employed herein, such terms are intended in a descriptive sense and not for purposes of limitation.

What is claimed is:

1. A method of processing spent mushroom substrate to co-produce biomass fiber for downstream processing and conversion and inorganic mineral fertilizer, the method comprising:
    (a) mixing the spent mushroom substrate and a fluid under conditions for extracting inorganic minerals from spent mushroom substrate to form a mixture;
    (b) separating solid biomass fiber from the mixture thereby producing a liquid extract phase and a solid phase comprising the biomass fiber for down stream processing and conversion;
    (c) mechanically dewatering the biomass fiber to obtain a substantially dewatered biomass, and heat drying the substantially dewatered biomass; and
    (d) concentrating the liquid extract phase thereby co-obtaining the inorganic mineral fertilizer.

2. The method of claim 1, wherein said mixing is done for about 10 to 40 minutes.

3. The method of claim 1, wherein the method further comprises centrifuging the liquid extract.

4. The method of claim 1, wherein the method further comprises adjusting a pH of the mixture to between about 4-7.

5. The method of claim 1, wherein step (b) comprises using a screener with aperture size of about 125 to 500 microns to separate the solid biomass fiber from the mixture.

6. The method of claim 1, wherein the method is devoid of solvents or microbes used to digest or hydrolyze the spent mushroom substrate.

7. The method of claim 1, wherein step (b) comprises using a screener with aperture size of about 125 to 500 microns to separate the solid biomass fiber from the mixture thereby producing a first liquid extract phase and a first solid phase comprising the biomass fiber; and wherein the method further comprises mechanically dewatering the first solid phase thereby obtaining a second solid biomass fiber and a second liquid extract, the second liquid extract being used as the liquid extract of step (c).

8. The method of claim 7, wherein a first portion of the second liquid extract is used as part of the fluid of step (a), and a second portion of the second liquid extract is used as the liquid extract to prepare the inorganic fertilizer.

9. The method of claim 8, wherein the first portion of the liquid extract comprises from about 50% to about 95% of the fluid of step (a).

10. The method of claim 1, wherein the concentration step comprises one or both of the following: (i) filtrating the liquid extract phase using reverse osmosis membranes, and (ii) using thermal energy.

11. The method of claim 1, wherein the fluid is only water.

12. The method of claim 1, wherein the method further comprises filtrating the liquid extract using ultra-filtration membranes.

13. The method of claim 1, wherein the method further includes the step of removing contaminants from the spent mushroom.

14. A method of processing corn-stover substrate to co-produce biomass fiber for downstream processing and conversion and inorganic mineral fertilizer, the method comprising:
    (a) mixing the corn-stover substrate and a fluid under conditions for extracting inorganic minerals from corn-stover substrate to form a mixture;
    (b) separating solid biomass fiber from the mixture using a screener with aperture size of about 125 to 500 microns to separate the solid biomass fiber from the mixture thereby producing a first liquid extract phase and a first solid phase comprising the biomass fiber thereby producing a first liquid extract phase and a first solid phase comprising the biomass fiber for down stream processing and conversion;
    (c) mechanically dewatering the first solid phase thereby obtaining a second solid biomass fiber and a second liquid extract; and
    (d) concentrating the second liquid extract phase thereby co-obtaining the inorganic mineral fertilizer.

15. The method of claim 14, wherein the method further comprises adjusting a pH of the mixture to between about 4-7.

16. The method of claim 14, wherein the method is devoid of solvents or microbes used to digest or hydrolyze the corn-stover substrate.

17. The method of claim 14, wherein a first portion of the second liquid extract is used as part of the fluid of step (a), and a second portion of the second liquid extract is used as the liquid extract to prepare the inorganic fertilizer.

18. The method of claim 14, wherein the fluid is only water.

19. A method of processing spent mushroom substrate to co-produce biomass fiber for downstream processing and conversion and inorganic mineral fertilizer, the method comprising:
    (a) mixing the spent mushroom substrate and a fluid under conditions for extracting inorganic minerals from spent mushroom substrate to form a mixture;
    (b) separating solid biomass fiber from the mixture using a screener with aperture size of about 125 to 500 microns thereby producing a first liquid extract phase and a first solid phase comprising the biomass fiber for down stream processing and conversion;
    (c) mechanically dewatering the first solid phase thereby obtaining a second solid biomass fiber and a second liquid extract; and
    (d) concentrating the second liquid extract phase thereby co-obtaining the inorganic mineral fertilizer.

* * * * *